March 30, 1954  I. A. BERG  2,673,807
PACKAGED PIE DOUGH
Filed Sept. 8, 1950  3 Sheets-Sheet 1

INVENTOR.
BY Isadore A. Berg
Wood, Arey, Henson & Evans
ATTORNEYS

March 30, 1954 — I. A. BERG — 2,673,807
PACKAGED PIE DOUGH
Filed Sept. 8, 1950 — 3 Sheets-Sheet 2

INVENTOR.
Isadore A. Berg
BY Wood, Arey, Hemon & Evans
ATTORNEYS

March 30, 1954     I. A. BERG     2,673,807
PACKAGED PIE DOUGH
Filed Sept. 8, 1950     3 Sheets-Sheet 3
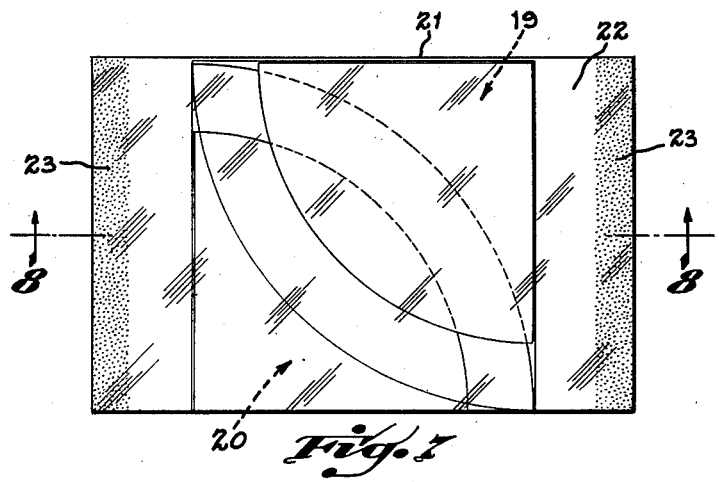
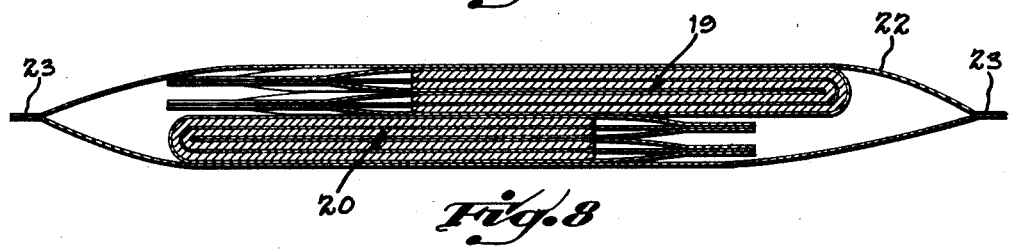
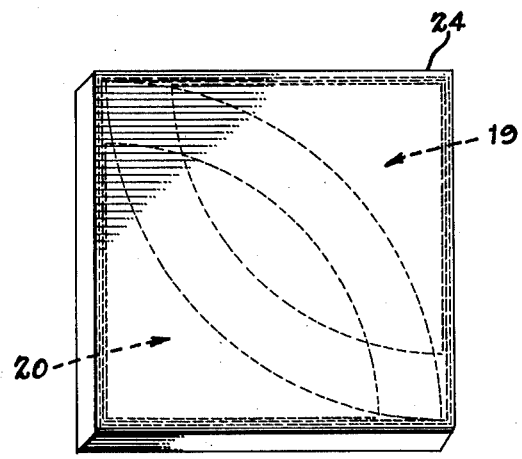
INVENTOR.
Isadore A. Berg
BY Wood, Auy, Hernin & Evans
ATTORNEYS

Patented Mar. 30, 1954

2,673,807

UNITED STATES PATENT OFFICE 2,673,807

PACKAGED PIE DOUGH

Isadore A. Berg, Cincinnati, Ohio

Application September 8, 1950, Serial No. 183,684

2 Claims. (Cl. 99—172)

This invention relates to prepared pie crust adapted to be sold in packaged form for use in the making of pies.

Various pie mixes and fillings are sold at the present time in dehydrated or ready-to-use form, but, in order to make pies from these preparations, it is still necessary for the housewife to prepare the dough from which the crust is made. The preparation of the dough and the rolling of it into the sheet-like form in which it is applied to the pie pan involves as much, if not more, work than the preparation of the filling, and the principal objective of this invention has been to provide a prepared pie dough composition, rolled to its final thickness and packaged for retail distribution so that the housewife may be relieved of the burden of preparing the dough at the time she wishes to bake a pie.

A pie crust ready to be baked in a pie pan is a sheet of dough ten inches to twelve inches in diameter (depending upon the size of the pie); yet it is only a fraction of an inch in thickness and, therefore, the sheet is inherently flimsy and difficult to handle. Any package containing a flat disc of dough obviously is too cumbrous and occupies too much space to be sold advantageously from the shelves or refrigerators of retail grocery establishments.

While pie dough is flimsy and mashes to a coherent mass unless properly handled in its original state, the same dough, when refrigerated, hardens and assumes a leathery consistency. In this state it is capable of retaining any shape previously imparted to it. Heretofore it has been proposed to fashion the thin sheet of dough into an elongated double folded shape and then fold back the endwise portions over the center portion, to provide a six layered mass. Subsequently, the product is frozen to render it capable of retaining its shape during shipment and in storage. However, the great multiplicity of folds in such packaging makes it virtually impossible for the housewife to open the folds without breaking or tearing the dough, even when it is allowed to reach room temperature, especially since adjoining layers tend to adhere to one another. Thus, while the ultimate compaction of a disc of dough in this manner provides a package of relatively small area, it is virtually impossible for the housewife to use the product in the intended manner without mutilating it.

From these observations, it is apparent that the problem has been not only to provide a package of pie dough which is sufficiently small in size to suit the space limitations imposed by the retailer, but also to dispose the dough within the package in such a manner that the disc of dough may be opened from a compacted state in a convenient manner suiting the dictates of the housewife.

This invention briefly is predicated upon the concept of preparing a disc of dough rolled to the desired thickness, and overfolding this disc upon itself into a quadrant of a circle after first placing a sheet of protective material upon the face of the dough to prevent the dough in adjacent layers from adhering. A disc of dough, when folded in quadrant form with adjacent layers prevented from adhering through interleaved protective sheets of paper or the like, comprises only two fold lines, one across the diameter upon which the disc is first folded to form a semi-circle and a second in which the half circle is folded into a quarter circle. Discs of dough thus folded in quadrant form may be refrigerated to a hardened consistency in which they readily survive transportation and storage without mutilation. Two quadrants of such nature oppositely arranged form a square of small area and, therefore, may be packaged in a rectangular box of small over-all size. Moreover, when the quadrant folded pieces of dough are removed from the package and are allowed to stand for a brief period of time, the dough is restored to its original pliancy and the layers in the quadrants may be readily unfolded in respect to one another to produce a disc which is in its original rolled condition, free of tears or ruptures.

This manner of packaging a disc of pie dough conveniently suits the space limitations of the retailer and the convenience of the housewife.

A still further objective of the present invention is to provide a packaged pie dough in which one or more dough discs are encased in a protective cover effective to exclude air and retain moisture and thereby preserve the dough in its original state. In this respect, the invention contemplates one or more pie dough discs encased in an envelope of regenerated cellulose or plastic sheet material capable of barring moisture loss and excluding air from the dough. The dough encased in such protective material is preferably, but not necessarily, inserted in a paper box to provide an attractive outer cover package.

A package of pie dough embodying these features is illustrated in the accompanying drawings, and from the foregoing principles of the invention and the following detailed description of one typical embodiment of the invention, those skilled in the art will readily comprehend the various modifications to which the improvement is susceptible.

Figure 7 is a top plan view of two quadrants of packaged dough inserted into an envelope.

Figure 8 is a cross sectional view taken along the line 8—8 of Figure 7.

Figure 9 is a top plan view of two quadrants of dough packaged in a box ready for distribution.

Figure 1:
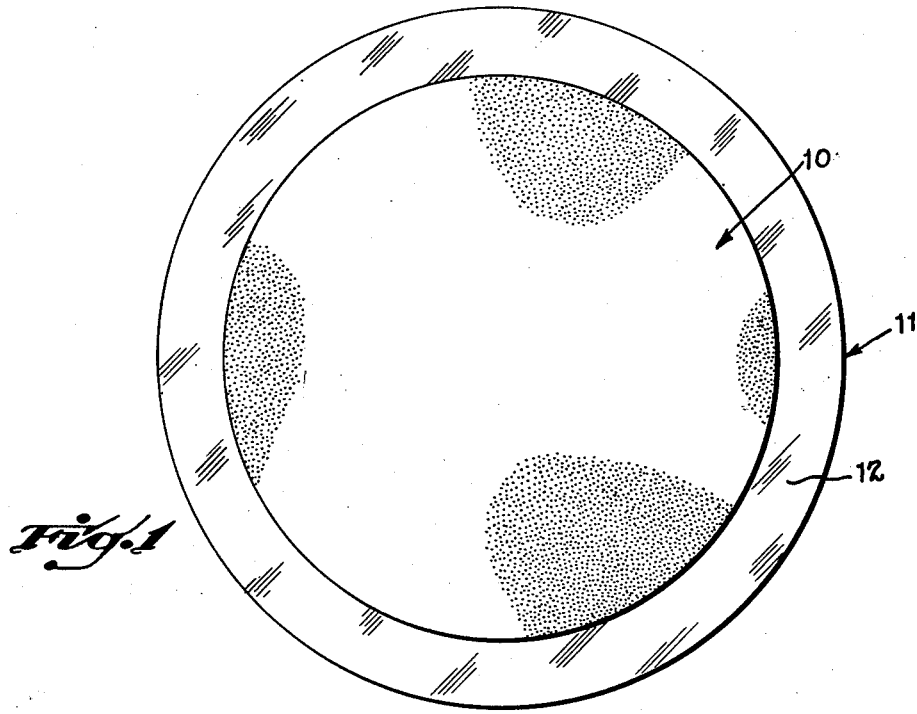
Figure 1 is a top plan view of a disc of dough placed upon a wrapping sheet.

The packaging of pie dough as shown in the drawings is extremely simple and well adapted to commercial use. Initially, the disc of dough 10, which has been rolled into the desired thickness and then cut to conform to the size of the pie pan in which it is to be baked, is placed centrally upon a circular wrapping sheet 11. The wrapping sheet 11, preferably formed of a moisture resistant material, such as vinyl polymer, regenerated cellulose, polyethylene, or the like, serves as a carrier for the disc of dough to facilitate the handling of it. Thus, the dough adheres lightly to the sheet 11 and the sheet, being strong, can be handled readily without danger of mutilating the disc of dough upon it. Additionally, it will be noted that the wrapping sheet extends beyond the disc of dough leaving an annular strip 12 which is later used to form a peripheral seal.

Figure 2:
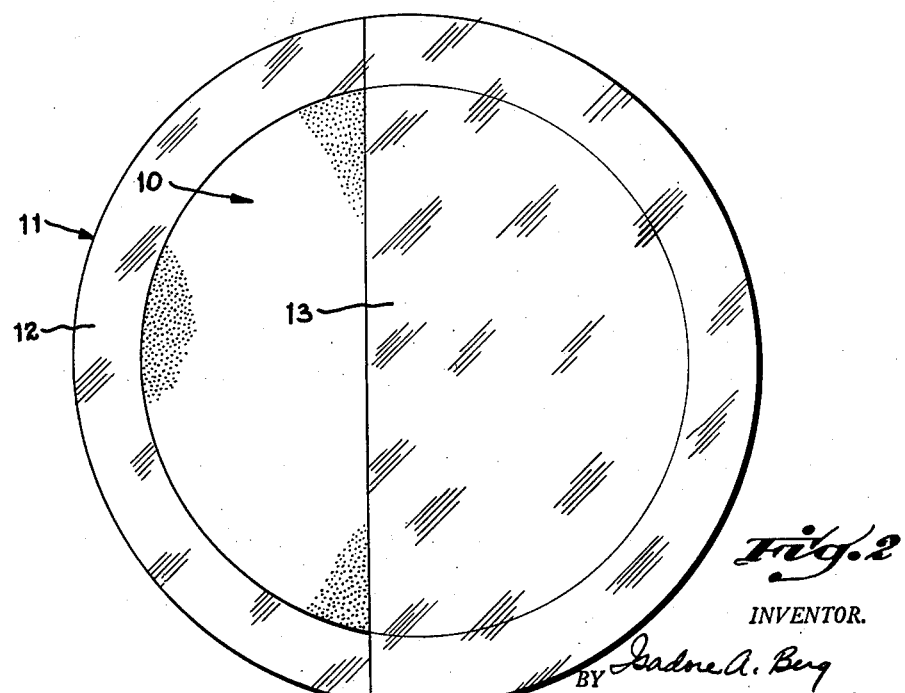
Figure 2 is a top plan view of the disc of dough upon the wrapping sheet with a slip sheet placed over the dough.
Figure 5:
Figure 5 is a cross sectional view taken along the line 5—5 of Figure 3.

Next, an interleaf 13, also preferably of plastic material of the type described, is placed over the disc of dough 10. This slip sheet 13 or interleaf prevents the two adjacent layers 14, 15 of dough (as shown in Figures 2 and 5) from adhering to one another when the flat disc of dough and wrapping sheet 11 are overfolded along a diameter 16 to form a semi-circle in the next operation. The interleaf 13 is preferably formed slightly larger than a semi-circle in order to provide an allowance for any slight inaccuracies in folding the dough sheet 10 to insure that the adjacent layers of dough 14, 15 will be completely separated by the slip sheet 13. Also, in extending across the diametrical fold line, interleaf 13 provides two thicknesses of material at the fold line to protect the dough from being cut or creased severely.

After the dough 10 and wrapping sheet 11 have been thus folded into a semi-circle, the peripheral edges 12 are adhesively united to completely encase the dough 10 in a protective envelope. By utilizing plastic sheet material of the heat sensitive type the seal may be completed by running a hot iron around the marginal portion of the wrapping sheet which surrounds the disc of dough. While the heat seal has been suggested as a well-known expedient for joining two plasticized surfaces, it is also contemplated that well-known other methods of adhesive sealing may be employed. It will be seen that after the sealing operation, the disc of dough 10 is encased in an envelope formed by the wrapping sheet 11 which prevents any moisture loss from the dough and excludes any air from coming into contact with the dough, and thereby prevents the dough from drying out or becoming contaminated in any manner. Also, as shown, the interleaf 13 may be joined with the wrapping sheet 10 along the periphery 12 so that two sealed compartments 17, 18 are formed, each containing one-half of the disc of dough 10.

Figure 3:
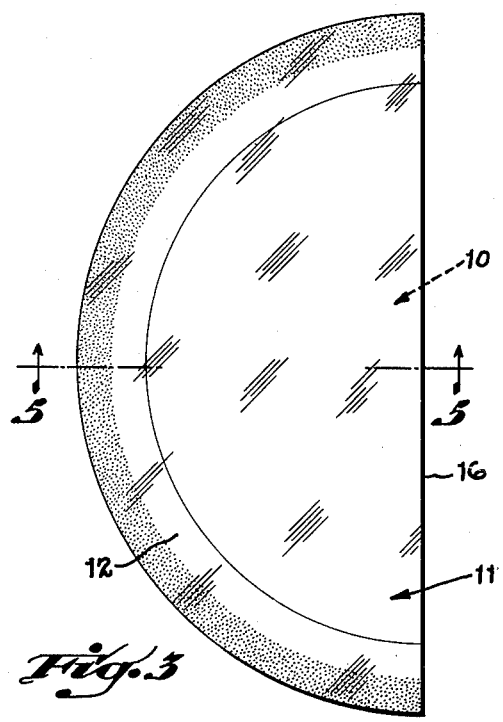
Figure 3 is a top plan view illustrating the dough sheet overfolded upon itself to form a semi-circle.
Figure 4:
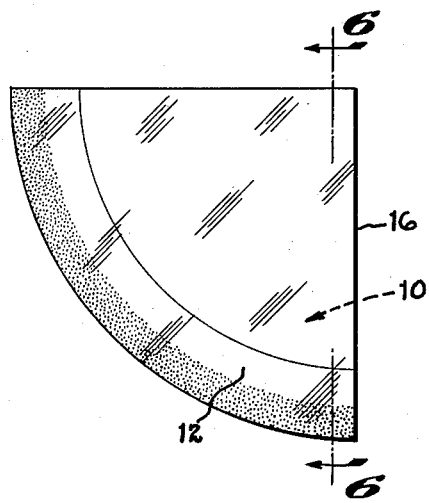
Figure 4 is a top plan view showing the dough sheet of Figure 3 folded again to form a quadrant.
Figure 6:
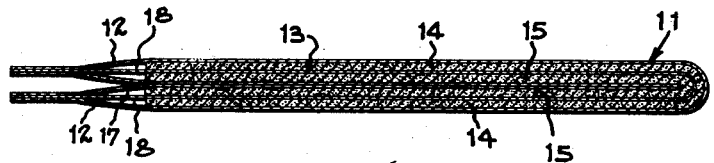
Figure 6 is a cross sectional view taken along the line 6—6 of Figure 4.

A second folding operation, as shown in Figures 3, 4 and 6 is next performed which further compacts the sheet of dough by overfolding the semi-circle into a quadrant. The original flat sheet of dough 10 is thus compacted to a relatively small area but each of the layers of dough is completely separated from the adjacent layer by a sheet of plasticized material. Furthermore, the entire disc of dough is sealed within the package to preserve it in its original state.

While the discs of dough may be sold in this form, that is, single sheets folded into quadrants, two of these quadrants 19 and 20, placed one upon the other in opposite arrangement so as to form a rectangle 21, provided a square unit adapted for insertion in a small rectangular box measuring 5–6" on each side and about ¾–1" thick. Such a package is well suited in size and shape to meet the space limitations of retail grocery establishments. Also, the two quadrants 19 and 20 may be slipped into a casing or envelope 22 formed of a protective material such as a vinyl polymer or the like. The edges 23—23 of this envelope may be sealed, as by passing a hot iron over them, to provide a further protective covering which also aids in preventing moisture loss from the dough or seepage of air into the sealed container. The envelope may then be placed inside the box, 24, if desired, in order to provide a more attractive outer cover package.

In the use of the product, the housewife or cook first removes the envelope 22 (if one is present) and allows the dough to warm to room temperature if it has previously been chilled. This restores the dough to pliant condition. Next, the upper half of the quadrant shape is unfolded and the marginal edgewise portions of the wrapper, now in semi-circular shape, may then be cut away by knife or scissors. By grasping the upper layer of wrapper material 11 along the edge opposite the fold line, the upper wrapper portion may be unfolded, and, on account of the adherence of the dough to the wrapper material, the top fold of dough is laid back with the wrapper. This exposes the dough disc, and the interleaf 13 is now removed and discarded.

In this condition, the dough disc resides on the disc of wrapper material 11. The housewife may now pick up the wrapper and associated disc of dough and lay the dough disc face down into a pie pan after which the wrapper 11 may be stripped away so as to leave the dough in place in the pan. These simple manipulations eliminate danger of tearing the dough during opening of the package or as the dough is being inserted into the baking pan.

Having described my invention, I claim:

1. A packaged pie dough product comprising, two thin disc-like sheets of pie dough, each disc faced at one side thereof with a protective sheet material and at the other side thereof with an interleaf, the protective sheet material and the interleaf for each disc of dough projecting marginally beyond the said dough disc, each of said discs being separately folded into a semicircle, and the interleaf thereof being disposed between adjacent layers of dough, the marginally projecting portions of the protective sheets for each disc being sealed respectively to the opposite faces of the marginally projecting portions of the interleaf for each disc and the sealed semicircles being folded into quadrants which respectively have linear edges each constituted by no more than two thicknesses of pie dough in depth, the dough in the said quadrants being frozen, and a substantially square package constituting a container for said quadrants, the said quadrants of pie dough being oppositely disposed one upon another within said package.

2. A packaged pie dough product comprising a thin disc of pie dough shaped to size for use, said disc of dough being faced at one side thereof with a protective sheet material having a peripheral portion extending marginally beyond the disc of dough, the other side of said disc of dough being faced with an interleaf which covers at least half of the said dough surface and which has portions extending marginally beyond the said disc of dough, the said disc of dough being folded along a diameter thereof so that the interleaf is disposed facially between adjacent layers of the folded dough disc, the marginally projecting portions of said protective sheet being sealed respectively to the opposite faces of the marginally projecting portions of the said interleaf, and the disc of dough being overfolded a second time to form a quadrant along the linear edges of which the pie dough is no more than two thicknesses in depth, the said dough within said package being frozen and adapted to be readied for use by thawing of the dough along the linear fold lines.

ISADORE A. BERG.

References Cited in the file of this patent

UNITED STATES PATENTS

| Number | Name | Date |
|---|---|---|
| 1,988,058 | Traller | Jan. 15, 1935 |
| 2,302,350 | Roth | Nov. 17, 1942 |
| 2,509,035 | Corbett | May 23, 1950 |

OTHER REFERENCES

"Quick Frozen Foods," May 1948, page 68.